(12) United States Patent
Kumar et al.

(10) Patent No.: US 11,526,840 B2
(45) Date of Patent: Dec. 13, 2022

(54) DETECTING INVENTORY CHANGES

(71) Applicant: Amazon Technologies, Inc., Seattle, WA (US)

(72) Inventors: Dilip Kumar, Seattle, WA (US); Elie Micah Kornfield, Seattle, WA (US); Alexander Clark Prater, Seattle, WA (US); Sridhar Boyapati, Sammamish, WA (US); Xiaofeng Ren, Yarrow Point, WA (US); Chang Yuan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 184 days.

(21) Appl. No.: 16/390,966

(22) Filed: Apr. 22, 2019

(65) Prior Publication Data

US 2019/0251499 A1    Aug. 15, 2019

Related U.S. Application Data

(63) Continuation of application No. 13/928,345, filed on Jun. 26, 2013, now Pat. No. 10,268,983.

(51) Int. Cl.
*G06Q 10/00* (2012.01)
*G06Q 10/08* (2012.01)
*G07G 1/00* (2006.01)

(52) U.S. Cl.
CPC ......... *G06Q 10/087* (2013.01); *G07G 1/0036* (2013.01)

(58) Field of Classification Search
CPC .............................. G06Q 10/087; G07G 1/0036
(Continued)

(56) References Cited

U.S. PATENT DOCUMENTS 6,236,736 B1 * 5/2001 Crabtree .......... G08B 13/19602
                                                           235/383
6,659,344 B2    12/2003 Otto et al.
(Continued)

FOREIGN PATENT DOCUMENTS

CA      2474254 A1    7/2003
CN    101149792 B     6/2010
(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.
(Continued)

*Primary Examiner* — Rokib Masud
(74) *Attorney, Agent, or Firm* — Athorus, PLLC

(57) ABSTRACT

This disclosure describes a system for tracking removal or placement of items at inventory locations with a materials handling facility. In some instances, a user may remove an item from an inventory location and the inventory management system may detect that removal and update a user item list associated with the user to include an item identifier representative of the removed item. Likewise, if the user places an item at an inventory location, the inventory management system may detect that placement and update the user item list to remove an item identifier representative of the placed item.

24 Claims, 8 Drawing Sheets

(58) Field of Classification Search
USPC .................................................. 705/16, 28
See application file for complete search history.

(56) References Cited

U.S. PATENT DOCUMENTS

| | | | |
|---|---|---|---|
| 7,225,980 B2 | 6/2007 | Ku et al. | |
| 7,522,057 B2 | 4/2009 | Stern et al. | |
| 7,693,758 B1 | 4/2010 | Bacco et al. | |
| 7,949,568 B2 | 5/2011 | Fano et al. | |
| 7,983,448 B1* | 7/2011 | da Vitoria Lobo | G06V 10/44 |
| | | | 382/199 |
| 8,009,864 B2 | 8/2011 | Linaker et al. | |
| 8,094,026 B1 | 1/2012 | Green | |
| 8,175,925 B1 | 5/2012 | Rouaix | |
| 8,189,855 B2 | 5/2012 | Opalach et al. | |
| 8,264,422 B1 | 9/2012 | Persson et al. | |
| 8,423,431 B1 | 4/2013 | Rouaix et al. | |
| 8,571,702 B1 | 10/2013 | Haake et al. | |
| 8,630,924 B2 | 1/2014 | Groenevelt et al. | |
| 8,678,281 B2 | 3/2014 | Kangas et al. | |
| 8,688,598 B1 | 4/2014 | Shakes et al. | |
| 8,726,195 B2 | 5/2014 | Bill | |
| 9,235,928 B2 | 1/2016 | Medioni et al. | |
| 9,473,747 B2 | 10/2016 | Kobres et al. | |
| 10,250,939 B2 | 4/2019 | Tegreene et al. | |
| 2002/0113123 A1 | 8/2002 | Otto et al. | |
| 2003/0002712 A1 | 1/2003 | Steenburgh et al. | |
| 2004/0181467 A1 | 9/2004 | Raiyani et al. | |
| 2005/0006569 A1 | 1/2005 | Yoshiyuki | |
| 2005/0189412 A1 | 9/2005 | Hudnut et al. | |
| 2006/0206235 A1 | 9/2006 | Shakes et al. | |
| 2006/0256082 A1 | 11/2006 | Cho et al. | |
| 2008/0019589 A1 | 1/2008 | Yoon et al. | |
| 2008/0055087 A1 | 3/2008 | Horii et al. | |
| 2008/0055194 A1 | 3/2008 | Baudino et al. | |
| 2008/0059570 A1 | 3/2008 | Bill | |
| 2008/0068170 A1 | 3/2008 | Ehrman et al. | |
| 2008/0077511 A1* | 3/2008 | Zimmerman | G06Q 10/00 |
| | | | 705/28 |
| 2008/0109114 A1 | 5/2008 | Orita et al. | |
| 2008/0183326 A1 | 7/2008 | Danelski | |
| 2008/0260212 A1 | 10/2008 | Moskal et al. | |
| 2008/0285791 A1 | 11/2008 | Suzuki et al. | |
| 2009/0003709 A1 | 1/2009 | Kaneda et al. | |
| 2009/0066513 A1 | 3/2009 | Kondo et al. | |
| 2009/0121017 A1 | 5/2009 | Cato et al. | |
| 2009/0245573 A1* | 10/2009 | Saptharishi | H04N 5/23206 |
| | | | 382/103 |
| 2010/0117959 A1 | 5/2010 | Hong et al. | |
| 2010/0134611 A1 | 6/2010 | Naruoka et al. | |
| 2010/0138037 A1 | 6/2010 | Adelberg et al. | |
| 2010/0191124 A1 | 7/2010 | Prokoski | |
| 2010/0277277 A1 | 11/2010 | Green et al. | |
| 2011/0011936 A1 | 1/2011 | Morandi et al. | |
| 2011/0242025 A1 | 10/2011 | Wen et al. | |
| 2011/0295644 A1 | 12/2011 | Hara et al. | |
| 2012/0206603 A1 | 8/2012 | Rekimto et al. | |
| 2012/0284132 A1 | 11/2012 | Kim et al. | |
| 2013/0021262 A1 | 1/2013 | Chen | |
| 2013/0027561 A1 | 1/2013 | Lee et al. | |
| 2013/0035950 A1 | 2/2013 | Macdonald et al. | |
| 2013/0054333 A1 | 2/2013 | Ross et al. | |
| 2013/0057670 A1 | 3/2013 | Fukuda | |
| 2013/0060577 A1 | 3/2013 | DeBusk et al. | |
| 2013/0073703 A1 | 3/2013 | Das et al. | |
| 2013/0076898 A1* | 3/2013 | Philippe | G06V 40/70 |
| | | | 348/143 |
| 2013/0110565 A1 | 5/2013 | Means, Jr. et al. | |
| 2013/0126611 A1 | 5/2013 | Kangas et al. | |
| 2013/0147839 A1 | 6/2013 | Fukushima et al. | |
| 2013/0253700 A1 | 9/2013 | Carson et al. | |
| 2013/0265232 A1 | 10/2013 | Yun et al. | |
| 2013/0284806 A1 | 10/2013 | Margalit | |
| 2013/0290106 A1 | 10/2013 | Bradley et al. | |
| 2014/0019264 A1 | 1/2014 | Wachman et al. | |
| 2014/0164176 A1 | 6/2014 | Kitlyar | |
| 2014/0244429 A1 | 8/2014 | Clayton et al. | |
| 2014/0244447 A1 | 8/2014 | Kim et al. | |
| 2014/0244488 A1 | 8/2014 | Kim et al. | |
| 2014/0253429 A1 | 9/2014 | Dai et al. | |
| 2014/0279294 A1 | 9/2014 | Field-Darragh et al. | |
| 2014/0279713 A1* | 9/2014 | Calman | G06Q 20/127 |
| | | | 705/418 |
| 2014/0362223 A1* | 12/2014 | LaCroix | G08B 13/19613 |
| | | | 348/150 |
| 2015/0012426 A1 | 1/2015 | Purves et al. | |
| 2015/0019391 A1 | 1/2015 | Kumar et al. | |
| 2015/0073907 A1 | 3/2015 | Purves et al. | |
| 2015/0074615 A1 | 3/2015 | Han et al. | |
| 2015/0206081 A1 | 7/2015 | Lee et al. | |
| 2015/0208043 A1 | 7/2015 | Lee et al. | |

FOREIGN PATENT DOCUMENTS

| | | |
|---|---|---|
| CN | 101976377 A | 2/2011 |
| JP | H0281806 A | 3/1990 |
| JP | 2000123086 A | 4/2000 |
| JP | 2001128814 A | 5/2001 |
| JP | 2002284317 A | 10/2002 |
| JP | 2005029391 A | 2/2005 |
| JP | 2006204473 A | 8/2006 |
| JP | 2009008966 A | 1/2009 |
| JP | 2009251625 A | 10/2009 |
| JP | 2011054038 A | 3/2011 |
| JP | 2011253344 A | 12/2011 |
| JP | 2012028948 A | 2/2012 |
| JP | 2012074014 A | 4/2012 |
| JP | 2013033512 A | 2/2013 |
| JP | 2013054593 A | 3/2013 |
| WO | 2003061366 A2 | 7/2003 |
| WO | 2010004719 A1 | 1/2010 |
| WO | 2013016803 A1 | 2/2013 |
| WO | 2013033442 A1 | 3/2013 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

Extended European Search report for EP Application No. EP 14 81 7650 dated Sep. 26, 2016.

First Office Action for Japanese Patent Application No. 2016-515139 dated Mar. 6, 2017.

International Preliminary Report on Patentability for PCT Application No. PCT/US2014/039474 dated Nov. 24, 2015.

International Preliminary Report on Patentability for PCT Application No. PCT/US2014/043033, dated Dec. 29, 2015.

International Search Report and Written Opinion of PCT Application No. PCT/US2014/039474, dated Oct. 17, 2014.

International Search Report and Written Opinion of PCT Application No. PCT/US2014/043033, dated Oct. 29, 2014.

Japanese Office Action for JP Patent Application No. 2016-523802 dated Feb. 13, 2017.

Search Report for Chinese Patent Application No. 101976377, dated Jun. 12, 2018.

Vaive Kalnikaite et al., "How to Nudge In Situ: Designing Lambent Devices to Deliver Information Salience in Supermarkets", Ubicomp '11 Proceedings of the 13th International Conference on Ubiquitous Computing, 2011, pp. 11-20, Publisher: ACM New York, NY, USA.

* cited by examiner

DETECTING INVENTORY CHANGES

PRIORITY CLAIM

This application is a continuation of U.S. patent application Ser. No. 13/928,345, filed Jun. 26, 2013, and titled "Detecting Item Interaction and Movement," the contents of which are herein incorporated by reference in their entirety.

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

Many of those physical stores also maintain inventory in a storage area, or fulfillment centers that can be used to replenish inventory located in the shopping areas and/or to satisfy orders for items that are placed through other channels (e.g., e-commerce). Other examples of entities that maintain inventory include libraries, museums, rental centers, and the like. In each instance, the user (e.g., picker, user, customer) must first locate the item and retrieve the item for use and/or purchase.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
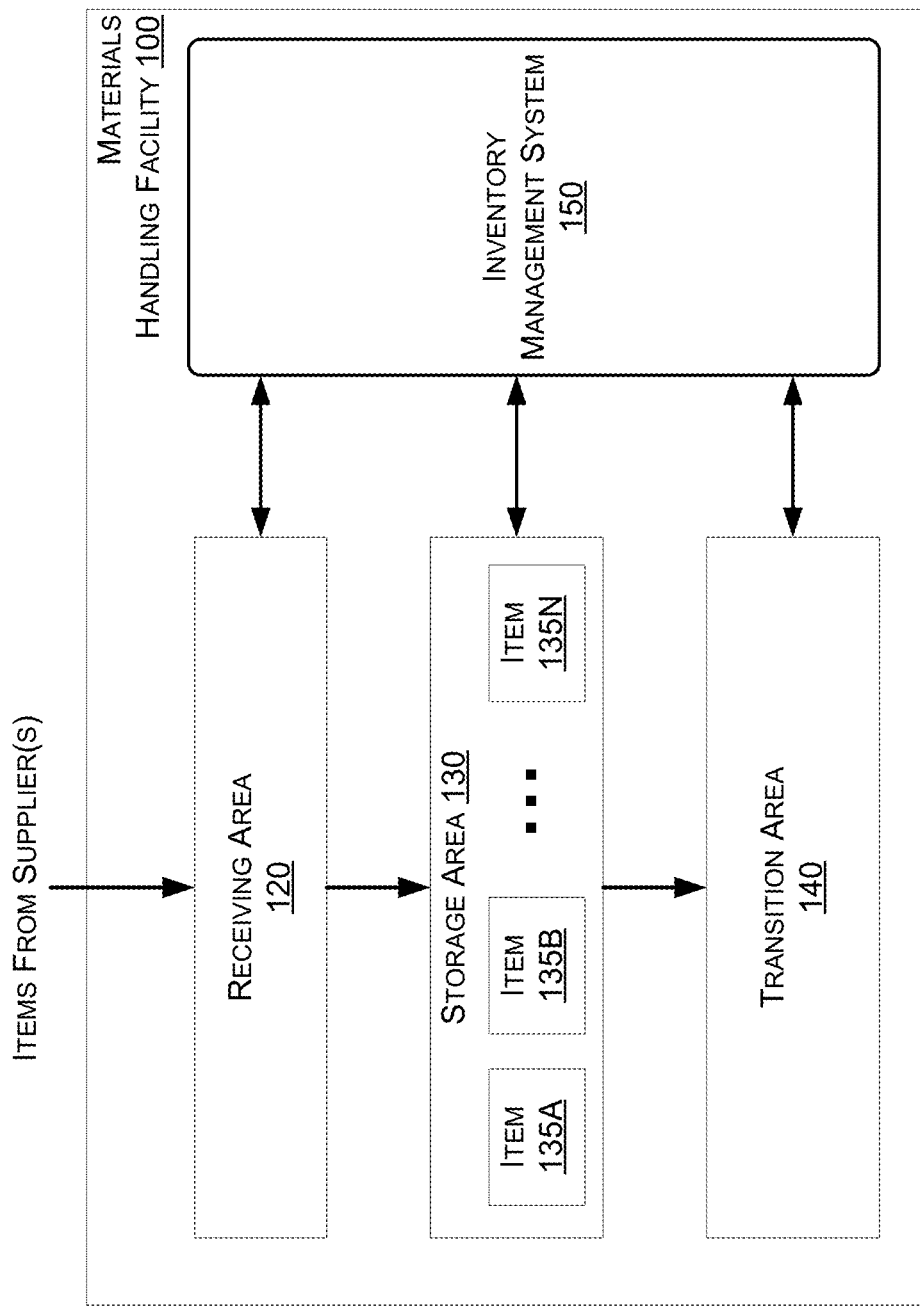
FIG. 1 is a block diagram illustrating a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes a system for tracking and identifying the removal and/or placement of items from inventory locations within a materials handling facility. In some instances, a user may remove an item from an inventory location within the materials handling facility. Upon detecting the removal, the removed item is identified and associated with a user item list associated with the user that removed the item. For example, if the user is a picking agent, the picking agent may have an associated user item list identifying all the items that the picking agent is to pick from various inventory locations located in the materials handling facility. When the picking agent picks an item, the item is identified and the user item list is updated to indicate that the picking agent has picked the item.

Likewise, if the user places an item at a location within the materials handling facility, the item is identified and the user item list associated with the user is updated. For example, if the user is a stowing agent, the stowing agent may have an associated user item list identifying all the items that the stowing agent is to stow into inventory within the materials handling facility. When the stowing agent places an item into an inventory location, the item is identified and the user item list is updated to indicate that the stowing agent has stowed that item.

In some implementations, the identity of items removed and/or placed into inventory locations within the materials handling facility may be identified based on data received from a variety of input devices. For example, an image capture device (e.g., a camera) may capture a series of images of a user's hand before the hand crosses a plane into the inventory location and also capture a series of images of the user's hand after it exits the inventory location. Based on a comparison of the images, it can be determined whether the user removed an object from the inventory location or placed an object into the inventory location. For example, based on an analysis of the images it can be determined that the user is not holding an object when the hand crosses the plane into the inventory location but is holding an object when the hand is removed from the inventory location (the user removed an object from the inventory location). Likewise, image analysis can be used to identify if the user is holding an object in their hand before the hand crosses into the inventory location but is not holding an object when the hand is removed from the inventory location (the user placed an object into the inventory location).

In examples where it is determined that a user has removed an object from the inventory location, it can be determined what items were stocked, stored or otherwise associated with the inventory location and the user item list may be updated to identify that the user has removed one of the items associated with that inventory location. By having knowledge of the items stored at an inventory location, actual identification of the removed item through processing of the captured images is not necessary. Simple and quick processing to detect that an object has been removed is sufficient. However, in some implementations, additional image processing may be performed to confirm that the removed object corresponds to the item associated with the inventory location prior to the user item list being updated.

In examples where it is determined that a user has placed an object into the inventory location, it can be determined what items where associated with the user prior to the placement of the object into the inventory location. Likewise, a stored representation of each of those items may be retrieved and compared with an image of the placed object in an effort to identify the placed object. If a high confidence score is determined from a comparison of the stored representations and the image of the placed object, the placed object may be identified as the item and the user item list may be updated to indicate that the user has placed the item. A further determination may also be made as to whether the placed item corresponds with, or is otherwise supposed to be located at the inventory location. If the placed item is supposed to be at that inventory location, a stock quantity for that item at that inventory location may be updated. However, if the placed item does not belong at that inventory location, an associate may be dispatched to retrieve the item from the inventory location.

By detecting the removal and/or placement of items by users in the materials handling facility, the movement of items within and exiting the materials handling facility may be accomplished without requiring the user to undergo additional transition of the items. For example, if the materials handling facility is a retail store, users may pick items from within the facility, place the items in a cart, bag, pocket, or otherwise carry the items and the items are automatically identified and associated with the user. When the user exits the facility the items may be transitioned from the facility to the user and the user charged for the items. This may be done without the user having to undergo the additional step of checking out with a cashier, the cashier identifying and scanning each item and the user paying the cashier for the item.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling.

An implementation of a materials handling facility configured to store and manage inventory items is illustrated in FIG. 1. As shown, a materials handling facility 100 includes a receiving area 120, a storage area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, storage areas 130 and transition areas 140 may be interspersed rather than segregated. Additionally, the materials handling facility 100 includes an inventory management system 150 configured to interact with each of receiving area 120, storage area 130, transition area 140 and/or users within the materials handling facility 100.

The materials handling facility 100 may be configured to receive different kinds of inventory items 135 from various suppliers and to store them until a user orders or retrieves one or more of the items. The general flow of items through materials handling facility 100 is indicated using arrows. Specifically, as illustrated in this example, items 135 may be received from one or more suppliers, such as manufacturers, distributors, wholesalers, etc. at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some implementations, like items 135 may be stored or displayed together in bins, on shelves or via other suitable storage mechanisms, such that all items 135 of a given kind are stored in one inventory location within the storage area 130. In other implementations, like items 135 may be stored in different locations. For example, to optimize retrieval of certain items 135 having high turnover within a large physical facility, those items 135 may be stored in several different inventory locations to reduce congestion that might occur at a single point of storage. In general, the inventory management system 150 may maintain a mapping or location information identifying where within the materials handling facility each item is stored. Each inventory item may be associated with the corresponding inventory location in which it is stored and the association may be maintained in an inventory data store 815 (FIG. 8) accessible by the inventory management system 150.

When a customer order specifying one or more of items 135 is received, or as a user progresses through the materials handling facility 100, the corresponding items 135 may be selected or "picked" from inventory locations within the storage area 130. For example, in one implementation a user may have a list of items to pick and may progress through the materials handling facility picking items 135 from the inventory locations within the storage area 130. In other implementations, materials handling facility employees may pick items 135 from inventory locations within the storage area 130 using written or electronic pick lists derived from customer orders.

As discussed in more detail below, one or more images of the user may be captured. For example, when the user reaches an inventory location and passes their hand into an inventory location within the storage area 130, one or more images may be captured of the user's hand prior to it passing into the inventory location. Again, when the user's hand is removed from the inventory location, one or more images may be captured of the user's hand as it exits the inventory location. Those images may be compared to determine whether a user has removed an object from the inventory location or placed an object in the inventory location. In some implementations, a simple image analysis may be performed to determine changes between the images. For example, image analysis may be performed on the first image to determine a skin tone color of the user's hand and pixels including that color, or a range of colors similar to the identified skin tone color may be identified to represent the user's hand. Utilizing the skin tone colors, the images of the user's hand obtained after the user's hand is removed from the inventory location may be processed to again identify the user's hand. Finally, a comparison of the segments of the images representing the user's hand and an area surrounding the user's hand may be compared to determine a change between the images to identify whether an object has been removed or placed into the inventory location. In another example, object recognition may be performed on both images to identify different objects. For example, the image (s) captured prior to the user's hand entering the inventory location may only include an object that is in the shape of hand. In comparison, the image(s) captured after the user's hand is removed from the inventory location may include an object in the shape of the user's hand plus an additional object (i.e., the item). It will be appreciated that any image analysis and/or comparison technique may be used to determine if a user has placed and/or removed an object from an inventory location.

Figure 2:
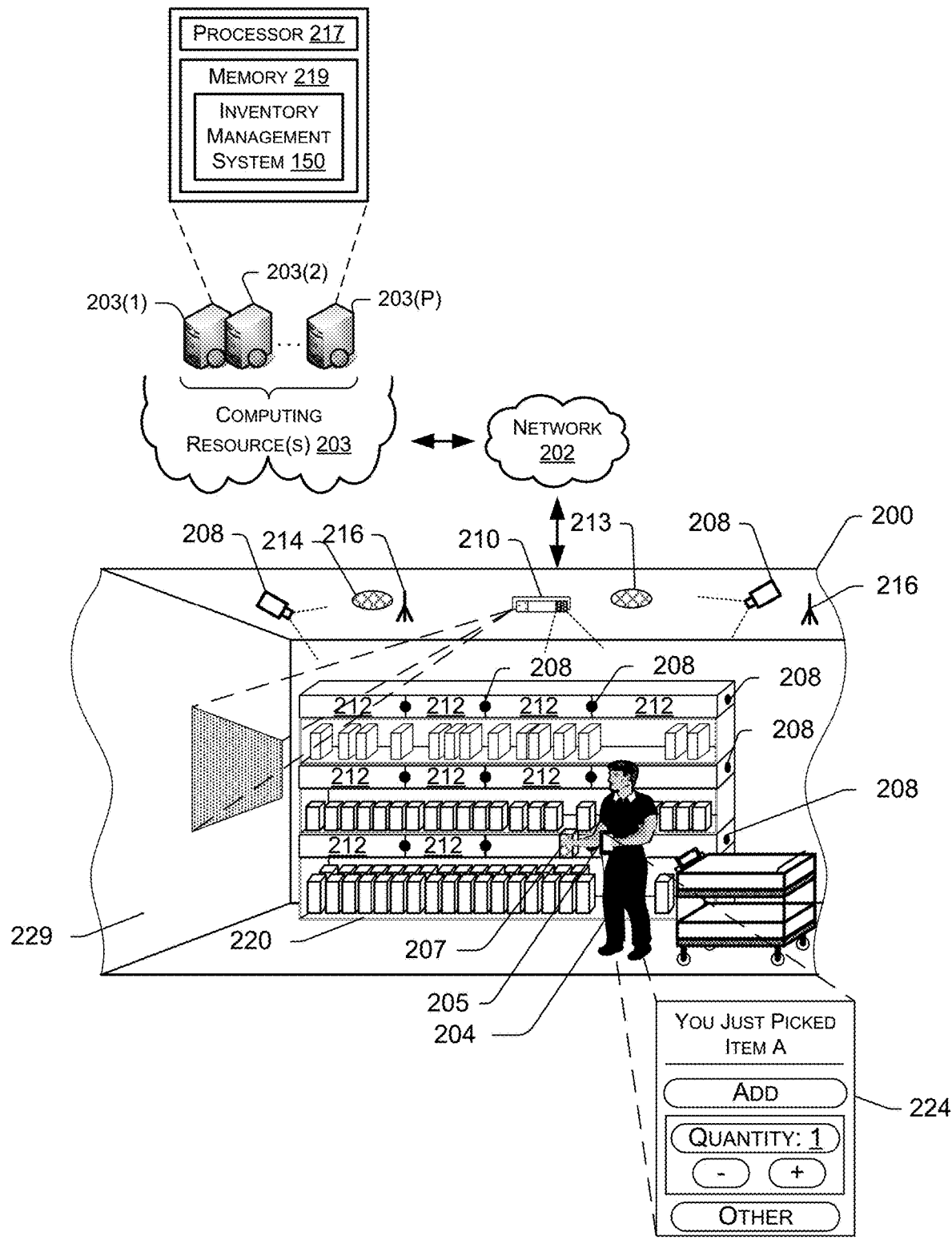
FIG. 2 is a block diagram illustrating additional details of a materials handling facility, according to some implementations.

FIG. 2 shows additional components of a materials handling facility 200, according to some implementations. Generally, the materials handling facility 200 may include one or more image capture devices, such as cameras 208. For example, one or more cameras 208 may be positioned in locations of the materials handling facility 200 so that images of locations within the materials handling facility can be captured. In some implementations, the image capture devices 208 may be positioned overhead, such as on the ceiling to capture images of user's and/or locations within the materials handling facility. In addition, in some implementations, one or more cameras 208 may be positioned on or inside of inventory locations. For example, a series of cameras 208 may be positioned on external portions of the inventory locations and positioned to capture images of user's and/or the location surrounding the inventory location. Likewise, one or more cameras 208 may be positioned within the inventory locations to capture images of items stored in the inventory locations and/or images of objects (e.g., a user's hand, items) moving into and/or out of the inventory locations.

Any type of camera and/or configuration of cameras may be used with the implementations described herein. For example, one or more of the cameras may be RGB cameras. In other implementations, one or more of the cameras may be depth sensing cameras.

In addition to camera's, other input devices, such as pressure sensors, infrared sensors, a scale, a volume displacement sensor, a light curtain, etc. may be utilized with the implementations described herein. For example, a pressure sensor and/or a scale may be used to detect when an object is added and/or removed from inventory locations. Likewise, an infrared sensor may be used to distinguish between a user's hand and inventory items.

In some implementations, a user 204 located in the materials handling facility 200 may possess a portable device 205 and obtain information about items 207 located within the materials handling facility 200 via the portable device. Generally, the portable device 205 has at least a wireless module to facilitate communication with the inventory management system 150 and a display (e.g., a touch based display) to facilitate visible presentation to and interaction with the user 204. The portable device 205 may store a unique identifier and provide that unique identifier to the inventory management system 150. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device 205 may operate in conjunction with or may otherwise utilize or communicate with one or more components of the inventory management system 150. Likewise, components of the inventory management system 150 may interact and communicate with the portable device 205 as well as identify the user, communicate with the user via other means and/or communicate with other components of the inventory management system 150.

The inventory management system 150 may also include other input/output devices, such as projectors 210, displays 212, speakers 213, microphones 214, etc. to facilitate communication between the inventory management system 150 and the user 204. In some implementations, multiple input/output devices may be distributed within the materials handling facility. Likewise, the inventory management system 150 may also include one or more communication devices, such as wireless antennas 216 that facilitate wireless communication (e.g., Wi-Fi, Near Field Communication (NFC), Bluetooth) between the inventory management system 150 and the portable device 205. The inventory management system 150 may also include one or more computing resource(s) 203 that may be local to the environment (e.g., materials handling facility), remote from the environment, or any combination thereof.

The inventory management system 150 may utilize antennas 216 within the materials handling facility to create a local wireless network 202 (e.g., Wi-Fi) so that the portable device 205 can connect to and communicate with the inventory management system 150. Likewise, in instances when one or more of the components of the inventory management system 150 are remote from the materials handling facility, they may communicate with other components of the inventory management system 150 and/or the portable device 205 via the network 202.

The following is an example use case that determines a user has removed an item from an inventory location within the materials handling facility. Upon entering the materials handling facility, the inventory management system 150 may identify the user (e.g., facial recognition, user ID cart, user provided information). Upon identifying the user, information (e.g., item retrieval history, view history, purchase history) may be retrieved from a data store. Likewise, the user may provide to the inventory management system 150 and/or have an associated pick list (user item list) identifying items to be retrieved from the materials handling facility retrieved from a data store.

In some implementations, as the user progresses through the materials handling facility 200, an imaging device 208 may obtain/capture one or more images of the user 204 and provide the image(s) to the computing resource(s) 203 for processing. For example, an image of a user's hand just before it crosses a plane into an inventory location and an image of the user's hand just after it is removed from the inventory location may be captured and provided to the computing resource(s) 203. The computing resource(s) 203 may process the images to determine whether an object has been removed or placed into the inventory location. If it is determined that an object has been removed from the inventory location, the inventory management system may obtain an identification of the inventory item stored at the inventory location and include an item identifier for that inventory item in a user item list associated with the user to identify that the user has removed (picked) the item from the inventory location. Likewise, an inventory quantity for the inventory item at that inventory location may be decreased to reflect that the item has been removed from the inventory location.

In another example, if the inventory management system 150 cannot identify the object the user removed from the inventory location, the inventory management system 150 may utilize other information about the user (e.g., past purchase history, currently picked items) to assist in identifying the object. For example, if the inventory management system cannot determine if the removed object is a bottle of catsup or a bottle of mustard, the inventory management system may consider past purchase history and/or what items the user has already removed from inventory locations. For example, if the user historically has only picked/purchased catsup, that information may be used to confirm that the user has likely removed catsup from the inventory location.

In some implementations, data from other input devices may be used to assist in determining the identity of objects removed and/or placed in inventory locations. For example, if it is determined that an object is placed into an inventory location, in addition to image analysis, a weight of the object may be determined based on data received from a scale or pressure sensor located at the inventory location. The image analysis may be able to reduce the list of potentially matching items down to a small list. The weight of the placed object may be compared to a stored weight for each of the potentially matching items to identify the item that was actually placed in the inventory location. By combining multiple inputs a higher confidence score can be generated increasing the probability that the identified item matches the item actually removed from the inventory location.

If information is presented to the user from the inventory management system 150, such information may be presented via the portable device 205 and/or other output devices positioned within the materials handling facility. The portable device may be used to identify to the user a confirmation of the item removed from the inventory location and/or to request that the user identify the inventory item removed/placed into the inventory location. For example, if the identity of a removed inventory item is confirmed but the inventory management system 150 cannot determine with a high degree of accuracy the number of inventory items removed, the inventory management system may provide such information to the user via the portable device 205. For example, the portable device may identify that the user has removed/picked item A from the inventory location. The user may then confirm whether the item is to be added to the user item list and/or how many of those items are to be added to the user item list, via the control 224. Other information and/or options relating to an item may also be presented to the user.

Figure 3:
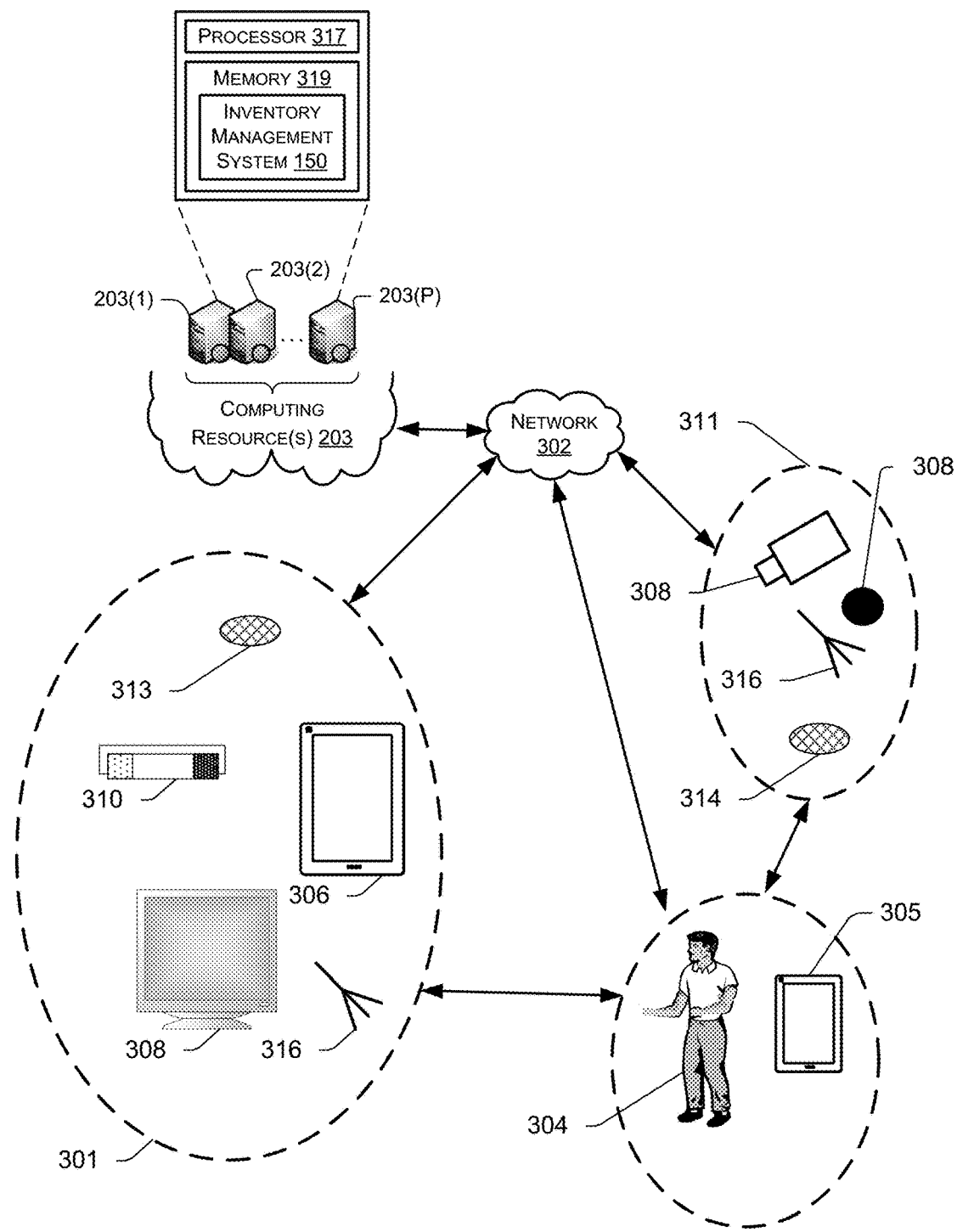
FIG. 3 shows additional components and communication paths between component types utilized in a materials handling facility of FIG. 1, according to some implementations.

FIG. 3 shows additional components and communication paths between component types utilized in an inventory management system 150 of FIG. 1, in accordance with some implementations. As discussed above, the portable device 305 may communicate and interact with various components of an inventory management system 150 over a variety of communication paths. Generally, the inventory management system 150 may include input components 311, output components 301 and computing resource(s) 203. The input components 311 may include a display 308, microphone 314, antenna 316, sensor (not shown), scale (not shown), light curtain (not shown), a volume displacement sensor (not shown) or any other component that is capable of receiving input about it surrounding environment, from the user of the portable device and/or from the portable device. The output components 301 may include a projector 310, a portable device 306, a display 308, an antenna 316, a radio (not shown), speakers 313 and/or any other component that is capable of providing output.

The inventory management system 150 may also include computing resource(s) 203. The computing resource(s) 203 may be local to the environment (e.g., materials handling facility), remote from the environment, or any combination thereof. Likewise, the computing resource(s) 203 may be configured to communicate over a network 302 with input components 311, output components 301 and/or directly with the portable device 305 and/or the user 304.

As illustrated, the computing resource(s) 203 may be remote from the environment and implemented as one or more servers 203(1), 203(2), . . . , 203(P) and may, in some instances form a portion of a network-accessible computing platform implemented as a computing infrastructure of processors, storage, software, data access, and so forth that is maintained and accessible by components/device of the inventory management system 150 via a network 302, such as the Internet. For example, the computing resources 203 may process images to determine whether an object has been removed from an inventory location or placed into an inventory location. The computing resource(s) 203 do not require end-user knowledge of the physical location and configuration of the system that delivers the services. Common expressions associated for these remote computing resource(s) 203 include "on-demand computing," "software as a service (SaaS)," "platform computing," "network-accessible platform," "cloud services," "data centers," and so forth.

Each of the servers 203(1)-(P) include a processor 317 and memory 319, which may store or otherwise have access to an inventory management system 150, which may include or provide image processing (e.g., for user identification, expression identification, and/or item identification), inventory tracking, and/or location determination.

The network 302 may utilize wired technologies (e.g., wires, USB, fiber optic cable, etc.), wireless technologies (e.g., RF, IR, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 4:
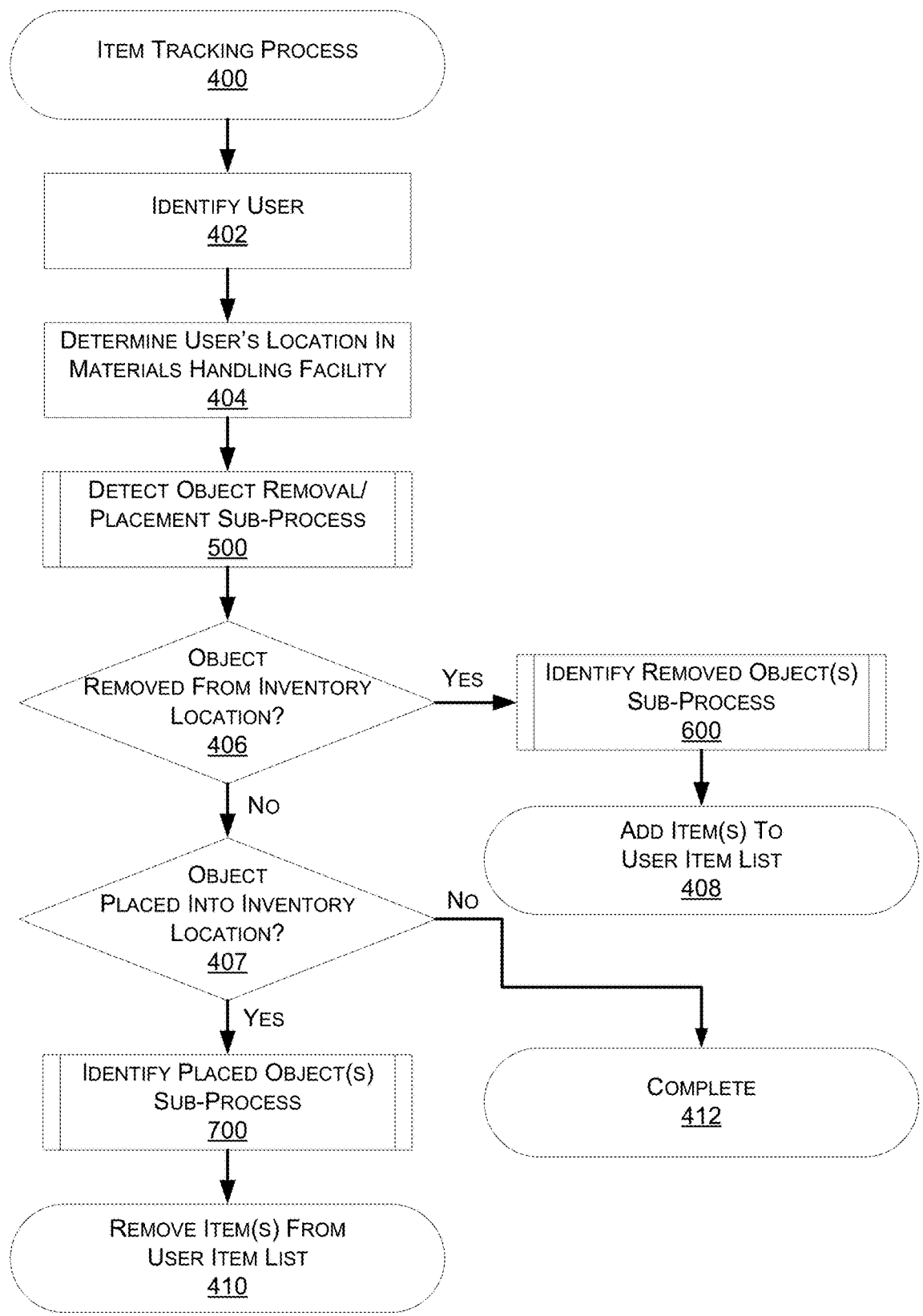
FIG. 4 depicts a flow diagram of an example process for tracking interaction and/or movement of an item, according to some implementations.

FIG. 4 depicts a flow diagram of an example process 400 for tracking interaction and/or movement of an item, according to some implementations. The process of FIG. 4 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 400 begins by identifying a user, as in 402. Various techniques may be used to identify a user. For example, image capture and facial recognition may be used. In another example, the user may identify themself with a personal identifier (e.g., badge), RFID card, etc. In some implementations, the user has a portable device that may be detected when the user enters the materials handling facility. The portable device may include a unique identifier that is provided to the inventory management system 150 and used to identify the user.

In addition to identifying the user, the user's location within the materials handling facility and identification of the inventory location within the user's location may also be determined, as in 404. In some implementations, imaging devices located within the materials handling facility may be used to capture images within the materials handling facility that are processed by the computing resource(s) 203 to identify the location of the user. Likewise, microphones may record sounds made by the user and the computing resource(s) may process those sounds to determine a location of the user. For example, based on knowledge of the locations of the microphones within the materials handling facility, a time offset between audio signals received by each microphone can be computed to determine a location of the user.

In order to identify the time offsets between signals received by various microphones, in some instances the computing resource(s) 203 compile each audio signal received by respective audio transducers and then determine the time offsets between the signals by, for instance, using any time-difference-of-arrival ("TDOA") technique, or any other suitable technique. After identifying the respective time offsets, the computing resource(s) 203 can determine a direction and/or source location of the audio.

In addition to, or as an alternative to visual and/or audio location determination, the inventory management system 150 may also utilize other techniques, such as triangulation between antennas 116, to determine the location of the user as the user moves through the materials handling facility. In other examples, if the user is carrying a portable device that includes a global positioning system (GPS) chip, the inventory management system may be configured to receive the GPS information and determine the location of the portable device, and thus the user.

The example process may also detect whether an object was removed from an inventory location or placed into an inventory location, as in sub-process 500. The sub-process 500 for determining if an object has been removed from an inventory location or placed into an inventory location is discussed in further detail below with respect to FIG. 5. As discussed below, in some implementations, it may be determined that both an object has been added to the inventory location and an object has been removed from the inventory location. For example, a user may place an object into the inventory location and during the same action remove another object from the inventory location.

Based on the response from the example sub-process 500, a determination is made as to whether an object was removed from the inventory location, as in 406. If it is determined that an object was removed from the inventory location, the sub-process 600 for identifying an identity of the removed object is performed, as in 600. The example sub-process 600 for determining an identity of an object removed from the inventory location is discussed further below with respect to FIG. 6. Following completion of the sub-process 600 for determining an identity of the removed object, the example process 400 adds an item identifier representative of the item to the user item list, as in 408.

Returning to decision block 406, if it is determined that an object has not been removed from the inventory location, a determination is made as to whether an object was placed into the inventory location, as in 407. If it is determined that an object was placed into the inventory location, the identity of the object is determined, as in sub-process 700. The example sub-process 700 for determining an identity of an object placed into an inventory location is discussed further below with respect to FIG. 7.

Once the identity of the object placed into the inventory location is determined, an item identifier representative of the item is removed from the user item list, as in 410. The item identifier may be removed from the user item list because the user has removed the item from their tote, cart, bag, etc. and placed it back into an inventory location.

Returning to decision block 407, if it is determined that an object has not been placed into the inventory location (i.e., an item is neither removed from the inventory location nor placed into the inventory location), the example process 400 completes, as in 412.

While the above example describes the process of placing or removing an item from the inventory location being performed serially, in other implementations, the blocks 406, 407, 408, 410 and sub-processes 600, 700 may be performed in parallel. For example, if the example sub-process 500 determines that a user has both placed an object into the inventory location and removed an object from the inventory location, the following sub-processes 600, 700 may be performed in parallel.

Figure 5:
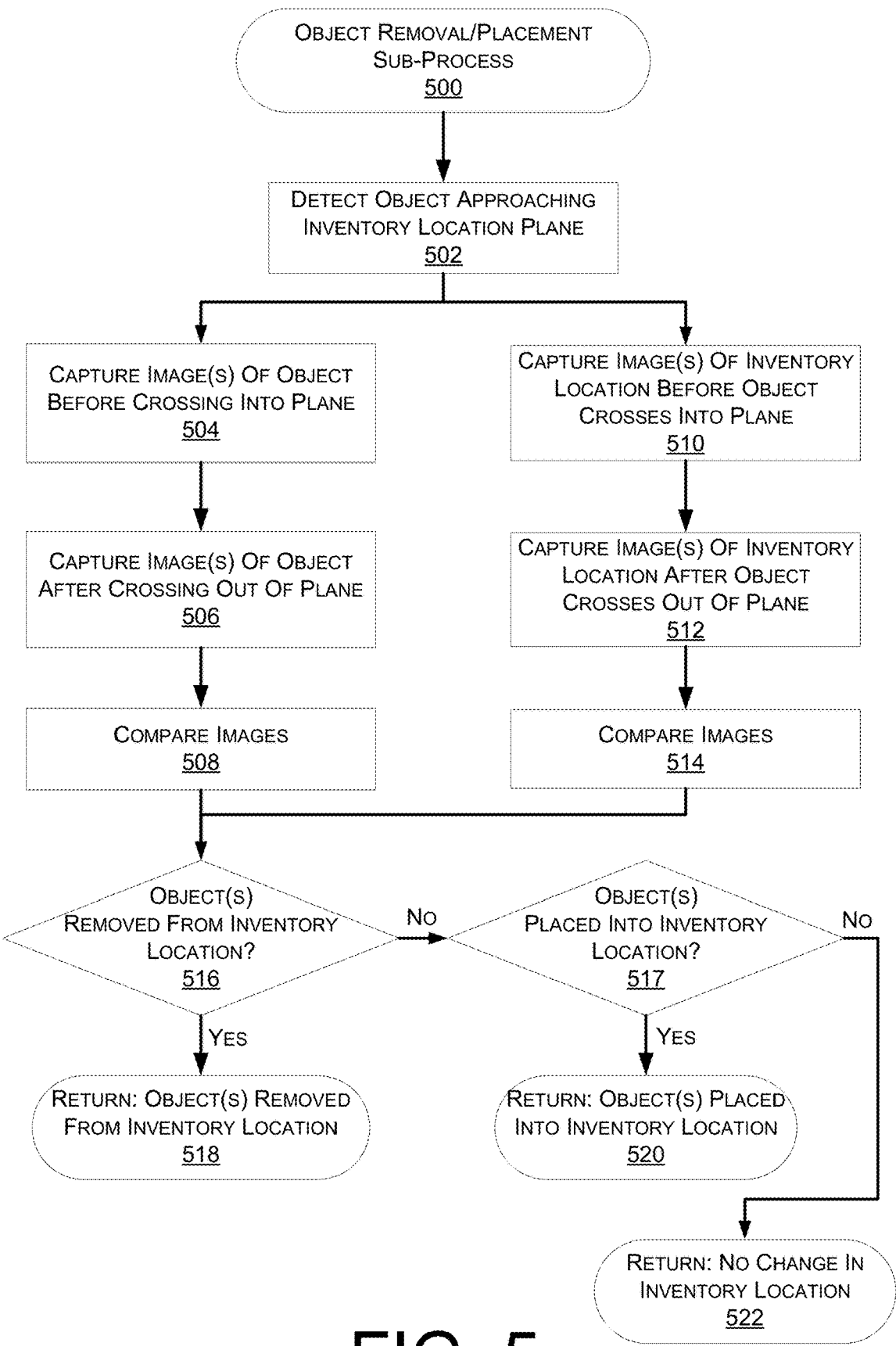
FIG. 5 depicts a flow diagram of an example object removal/placement sub-process, according to some implementations.

FIG. 5 depicts a flow diagram of an example object removal/placement sub-process 500, according to some implementations. The example sub-process 500 begins by detecting an object, such as a user's hand approaching the vertical plane representing the face or front edge of the inventory location, as in 502. This object may be detected based on image processing of images captured of the location that includes the inventory location. In other examples, the object may penetrate a light curtain or other presence detection device. Upon detecting an object approaching the inventory location and before the object crosses the plane into the inventory location, one or more images are captured that include the object, as in 504. Subsequently, and after the object is removed from the inventory location, one or more images are captured that include the object, as in 506. In some implementations, the one or more images of the object before it enters the inventory location and/or after it is removed from the inventory location may be a series of images that make up a video.

The image(s) captured before the object entered the inventory location and the image(s) captured after the object is removed from the inventory location are then compared, as in 508. For example, a pixel similarity may be performed on the images to identify similar content. For example, if the object is a user's hand, pixels of a similar color matching a color pallet typically associated with skin tones may be identified and determined to represent the user's hand. By performing this pixel analysis on both images captured before the object enters the inventory location and images captured after removing the object from the inventory location, the same object (in this example the user's hand) may be identified in each image. Based on this information, surrounding pixels may be compared between the images to determine if an object was either included in the user's hand when it went into the inventory location and/or whether an object was included in the user's hand when it was removed from the inventory location.

For example, pixels of a similar color and shape included in the images captured before the user's hand entered the inventory location may be detected and determined to represent an object. If those similar pixel shapes and/or colors are not identified in the image(s) capture after the user removes their hand from the inventory location, it may be determined that the user has placed an object into the inventory location.

Likewise, if only the user's hand is identified in images captured before the user's hand is placed into the inventory location and pixels representing a distinct shape are identified in the image(s) captured when the user removes their hand from the inventory location, it may be determined that the user has removed an object from the inventory location.

Returning to block 502, in some implementations, one or more processes of capturing images may be performed to provide further information for determining if an object has been removed from an inventory location or placed into an inventory location. For example, the example sub-process may also utilize one or more cameras located within the inventory location to capture one or more images of inventory stored at the inventory location before the object crosses into the inventory location, as in 510. For example, images of inventory stored in the inventory location may be periodically captured and stored in an inventory data store accessible by the inventory management system 150.

After an object (e.g., users hand) has moved into and out of the inventory location, one or more images of the inventory location may be captured, as in 512. The image(s) representing the inventory stored in the inventory location prior to the object entering the inventory location and the images representing the inventory stored in the inventory location after the object is removed from the inventory location may be compared to determine if an object has been added to or removed from the inventory location, as in 514.

In some implementations, because inventory items are generally stationary when stored in the inventory location a simple image comparison from a fixed position camera may be performed to determine changes between the images and thus a determination made as to whether one or more objects have been removed from the inventory location and/or whether one or more objects have been added to the inventory location. This may be particularly useful when it is difficult to determine, based on images of the object moving into an out of the inventory location, how many objects were removed and/or placed into the inventory location. For example, if the inventory includes bags of chips and the user removes multiple bags of chips by grabbing the tops of the bags together, it may be difficult to determine from the images captured from outside the inventory location how many bags were removed. However, because the bags are stationary when stored in the inventory location, a quantity of bags stored in the inventory location may be determined by capturing one or more images of the inventory location, processing those images to identify shapes of objects and comparing the number of shapes with the quantity of inventory located at that inventory location. Each shape may then be associated with an item of inventory. Likewise, addition information, such as the stored dimension values for the inventory items may also be utilized to assist in determining the number of items located in the inventory location. In a similar fashion, images captured after the inventory items have been removed may be captured and processed to identify the number of objects included in those images. By comparing the before and after quantity count of items identified in the images, it may be determined how many items were removed from the inventory location.

While the example sub-process 500 illustrates image capture and comparison steps 504-508 being performed in parallel with the image capture and comparison steps 510-514 in other implementations only one of the series of steps may be performed. In other implementations, the sets of steps may be performed serially.

Utilizing the comparison of the images, a determination may be made as to whether one or more objects were removed from the inventory location, as in 516, and/or placed into the inventory location, as in 517. If it is determined that one or more objects were removed from the inventory location, the example sub-process returns an indicator that an object(s) has been removed from the inventory location. If it is determined that an object has not been removed from the inventory location, a determination is made as to whether one or more objects have been placed into the inventory location, as in 517. If it is determined that one or more objects have been placed into the inventory location, the example sub-process 500 returns an indication that an object(s) has been placed into the inventory location, as in 520. As noted above, it may be determined that an object has been placed into the inventory location and another object has been removed from the inventory location. In such an instance, blocks 518 and 520 may both be completed and information regarding both occurrences may be returned.

Finally, if it is determined that an object has not been placed into the inventory location (i.e., an object has not been removed from the inventory location or placed into the inventory location) the example sub-process 500 returns an indication that there has been no change in the inventory location, as in 522.

Figure 6:
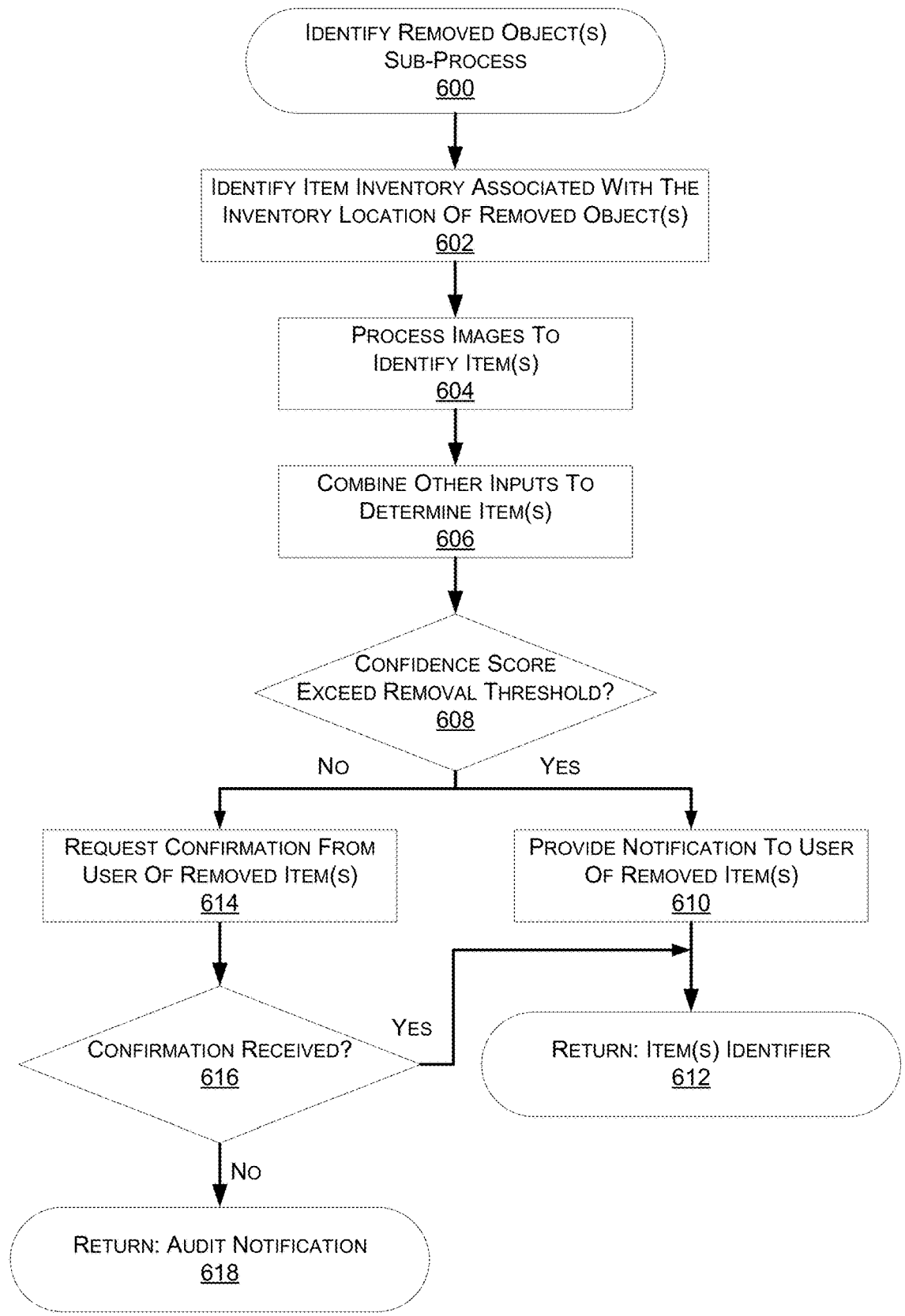
FIG. 6 depicts a flow diagram of an example sub-process for identifying a removed object, according to some implementations.

FIG. 6 depicts a flow diagram of an example sub-process 600 for identifying a removed object, according to some implementations. The example sub-process 600 begins by identifying item inventory associated with the inventory location of the removed object, as in 602. As discussed above, the inventory management system may store inventory information for each inventory location, identifying the inventory items and quantity of inventory items stored at each inventory location. In addition to identifying the inventory associated with the inventory location, in some implementations one or more of the images captured in steps 504-506, 510-512 (FIG. 5) may be processed to identify the object that has been removed from inventory to confirm that the inventory item associated with the inventory location corresponds with the inventory identified (object) in the images. For example, in some implementations, image processing may be performed to identify the object included in the images and/or to identify features of the object. Such information may be compared to stored information about the inventory item to confirm whether the captured image of the object corresponds with the information for inventory items associated with the inventory location.

In some implementations, other inputs may also be considered to determine the identity of the object that was removed from the inventory location, as in 606. For example, in some implementations, a change in a pressure sensor and/or weight sensor may be received and compared with a stored weight for inventory items located at the inventory location.

Based on the information utilized to determine the identity of the object removed from the inventory location, a confidence score may be determined identifying how probable it is that the identified item corresponds with the object actually removed from the inventory location. A determination may then be made as to whether the confidence score exceeds a removal threshold, as in 608. The removal threshold may be any defined number to be exceeded before the identified item is determined to correspond with the object actually removed from the inventory location.

If it is determined that the confidence score exceeds the removal threshold, a notification may be provided to the user identifying the item the user has removed from the inventory location, as in 610. As discussed above, the notification may be presented on a display located on or near the inventory location, presented on a portable device in possession of the user, projected onto a surface near the user, etc. Likewise, the example sub-process 600 also returns an identification of the object removed from the inventory location, as in 612.

However, if it is determined that the confidence score does not exceed the removal threshold, a request that the user confirm the identity of the removed object may be presented to the user, as in 614. For example, the example sub-process 600 may present to the user (e.g., via a display, portable device, projection, audible) the item or items that it believes were removed and request that the user confirm the identity of the actually removed item. Likewise, if the example sub-process 600 is not able to determine a number of items removed from the inventory location, a request may be presented asking the user to confirm a number of items removed from the inventory location. In some implementations, if the suggested item does not correspond to the item actually removed, the user can interact with the inventory management system to identify the actual removed item and/or the quantity of removed items.

In some implementations, in addition to, or instead of, presenting the item to the user, the captured images may be provided to an associate that reviews the images to identify the placed and/or removed object. If the associate can determine the identity of the object, a request may not be sent to the user and instead the item identifier of the identified object may be returned, as in 612.

After presenting the request to the user, a determination may be made as to whether the user provided the requested confirmation, as in 616. If it is determined that the user has provided a confirmation, the example sub-process proceeds to block 612 and continues as discussed above. However, if the user does not provide a confirmation, the example sub-process 600 may return an audit notification indicating to the inventory management system that the user needs to be audited prior to the inventory transitioning within or from the materials handling facility, as in 618. In some implementations, the audit notification may result in an associate being dispatched to the user to confirm the identity of the object removed from the inventory location. In other examples, the audit notification may be maintained by the inventory management system and when the user enters a transition area an associate may be notified of the need to audit the items in the possession of the user.

Figure 7:
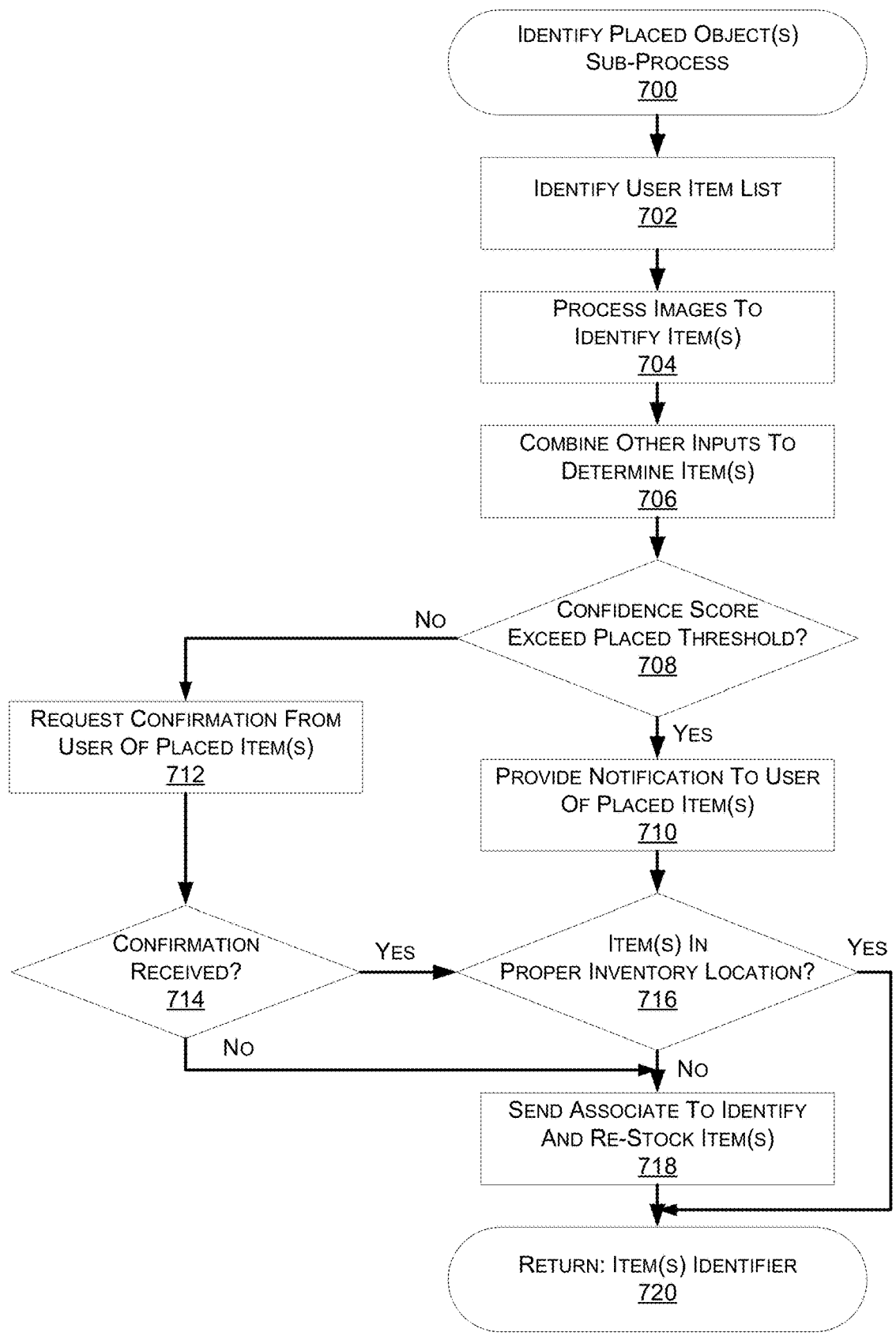
FIG. 7 depicts a flow diagram of an example sub-process for identifying a placed object, according to some implementations.

FIG. 7 depicts a flow diagram of an example sub-process 700 for identifying a placed object, according to some implementations. The example sub-process 700 begins by identifying items identified in the user item list associated with the user, as in 702. As discussed above, the user item list identifies items that the user has removed from inventory locations while in the materials handling facility. In addition, images captured at blocks 504-506, 510-512 (FIG. 5) may be further processed to detect an identity of an item placed into an inventory location. For example, the images may be processed to detect a size or shape of an object, a color of an object, characters or other identifying information for the object, etc. The detected information may then be compared with information stored for each of the items included in the user item list to determine items that the user has potentially placed into the inventory location. For example, if the user item list identifies a bottle of catsup, a bag of chips, a gallon of milk, a screw driver, and a soda bottle, stored information for each of those items may be retrieved and used to compare with the information detected from the processed images in an effort to determine which item identified in the user item list was placed in the inventory location.

In addition to comparing information determined from the captured images, the example sub-process may also combine other inputs to determine an identity of the object, as in 706. Continuing with the above example, the inventory location may include a scale and a weight of the object placed into the inventory location can be determined. The determined weight may then be compared with weights stored for each item included in the user item list to identify those that potentially correspond with the object placed into the inventory location. As another example, the inventory location may include a pressure sensor that can detect a shape or dimension of the bottom of the object as it sits on the pressure sensor. The shape of the bottom of the object may be compared with stored dimension information for each item on the user item list.

Based on the gathered information about the object placed into the inventory location, a confidence score may be determined representing a probability that the identified item represents the object actually placed into the inventory location. A determination may then be made as to whether the confidence score exceeds a placed item threshold, as in 708. Similar to the removed item threshold, the placed item threshold may be any defined score or value.

If it is determined that the confidence score exceeds the placed item threshold, a notification is provided to the user identifying the item that the user placed into the inventory location, as in 710. However, if the confidence score does not exceed the placed item threshold, a request may be presented asking the user to confirm the identity of the object placed into the inventory location. For example, the example sub-process 700 may present to the user the identity of item(s) that it believes may have been placed into the inventory location. Likewise, the example sub-process 700 may request that the user identify a quantity of items placed into the inventory location.

A determination may then be made as to whether a confirmation was received from the user, as in 714. If it is determined that a confirmation was received, or after providing a notification to the user of the item placed into the inventory location, a determination is made as to whether the identified item is in the proper inventory location, as in 716. As discussed above, the inventory management system 150 may maintain inventory in specific inventory locations throughout the materials handling facility. If an item is placed into an inventory location that does not typically store that inventory item it may be determined that the placed item is not in the proper inventory location. In other implementations, inventory may be placed in any inventory location. In such a representation, the decision block 716 may not be considered.

If it is determined that the identified item is not in the proper inventory location, or if it is determined that the user did not confirm an identity of the object placed into the inventory location, an associate may be dispatched to the inventory location to retrieve and/or identify the placed object, as in 718. In some implementations, the associate may be a human. In other implementations, the associate may be an automated drive unit and/or a robot configured to manage and/or handle inventory.

If it is determined that the placed item is in the proper inventory location and/or after dispatching an associate to retrieve the inventory item, the example sub-process 700 may return an identification of the placed inventory item. In instances where the example sub-process was not able to identify the object placed into the inventory location such that the confidence score exceeded the placed item threshold and the user did not provide a confirmation of the object's identity, block 720 may be delayed until the dispatched associate has identified the placed item.

Figure 8:
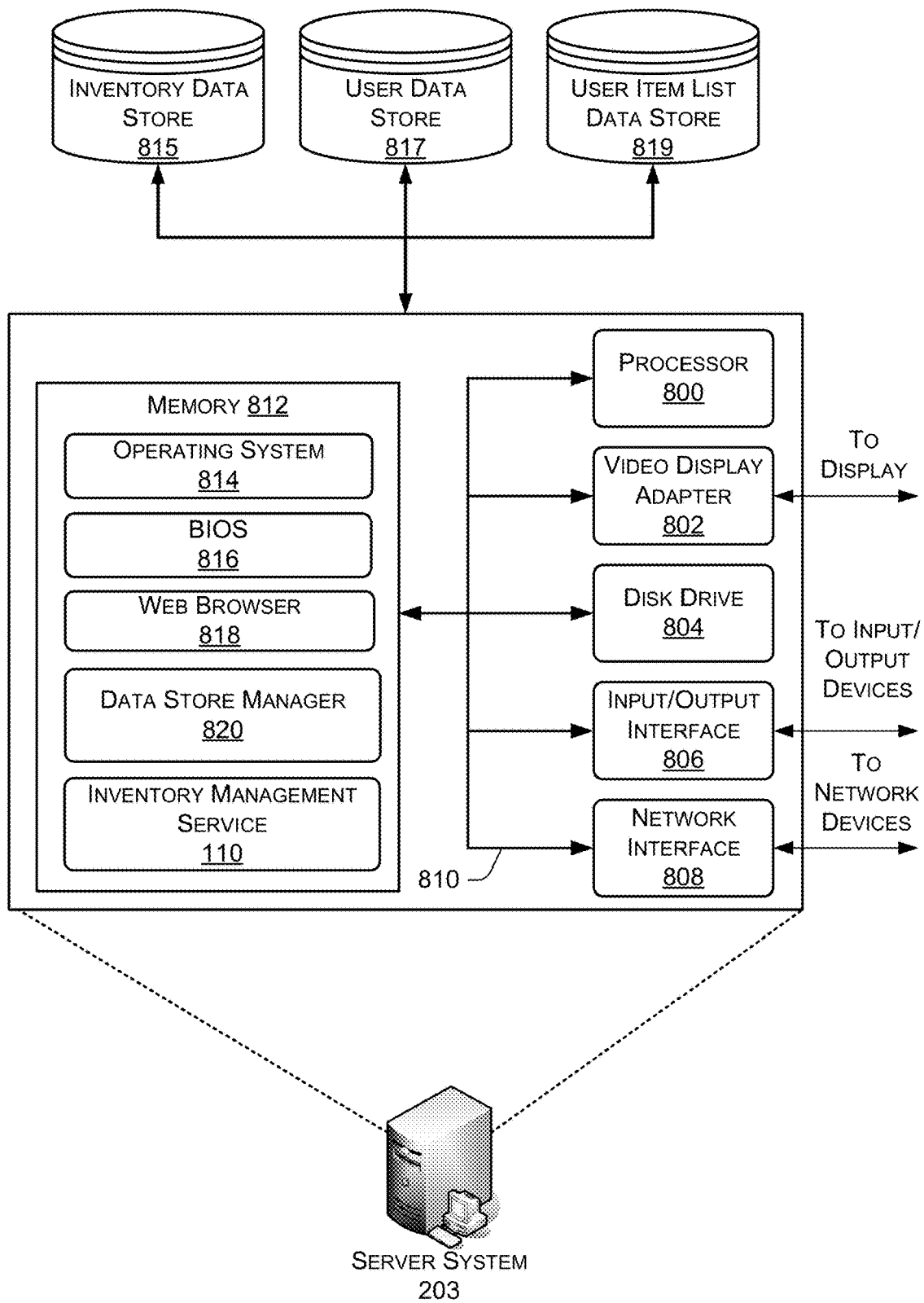
FIG. 8 is a block diagram of an illustrative implementation of a server system that may be used with various implementations, such as the remote computing resources.

FIG. 8 is a pictorial diagram of an illustrative implementation of a server system, such as the remote computing resource 203 that may be used in the implementations described herein. The remote computing resource 203 may include a processor 800, such as one or more redundant processors, a video display adapter 802, a disk drive 804, an input/output interface 806, a network interface 808, and a memory 812. The processor 800, the video display adapter 802, the disk drive 804, the input/output interface 806, the network interface 808, and the memory 812 may be communicatively coupled to each other by a communication bus 810.

The video display adapter 802 provides display signals to a local display (not shown in FIG. 8) permitting an operator of the server system 203 to monitor and configure operation of the server system 203. The input/output interface 806 likewise communicates with external input/output devices not shown in FIG. 8, such as a mouse, keyboard, scanner, or other input and output devices that can be operated by an operator of the remote computing resource 203. The network interface 808 includes hardware, software, or any combination thereof, to communicate with other computing devices. For example, the network interface 808 may be configured to provide communications between the server system 203 and other computing devices via the network 202, as shown in FIG. 2.

The memory 812 generally comprises random access memory (RAM), read-only memory (ROM), flash memory, and/or other volatile or permanent memory. The memory 812 is shown storing an operating system 814 for controlling the operation of the server system 203. A binary input/output system (BIOS) 816 for controlling the low-level operation of the server system 203 is also stored in the memory 812.

The memory 812 additionally stores program code and data for providing network services that allow the inventory management system 150 to track items removed from inventory locations and/or placed into inventory locations. Accordingly, the memory 812 may store a browser application 818. The browser application 818 comprises computer executable instructions, that, when executed by the processor 800 generate or otherwise obtain configurable markup documents such as Web pages. The browser application 818 communicates with a data store manager application 820 to facilitate data exchange between the inventory data store 815, the user data store 817 and/or the user item list data store 819.

As used herein, the term "data store" refers to any device or combination of devices capable of storing, accessing and retrieving data, which may include any combination and number of data servers, databases, data storage devices and data storage media, in any standard, distributed or clustered environment. The remote computing resource 203 can include any appropriate hardware and software for integrating with the data stores 815, 817, 819 as needed to execute aspects of the inventory management system 150.

The data stores 815, 817, 819 can include several separate data tables, databases or other data storage mechanisms and media for storing data relating to a particular aspect. For example, the data stores 815, 817, 819 illustrated include mechanisms for inventory information, user information, etc. which can be used to identify an item removed from an inventory location and/or placed into an inventory location.

It should be understood that there can be many other aspects that may be stored in the data stores 815, 817, 819. The data stores 815, 817, 819 are operable, through logic associated therewith, to receive instructions from the remote computing resource 203 and obtain, update or otherwise process data in response thereto.

The memory 812 may also include the inventory management system 150, discussed above. The inventory management system 150 may be executable by the processor 800 to implement one or more of the functions of the remote computing resource 203. In one implementation, the inventory management system 150 may represent instructions embodied in one or more software programs stored in the memory 812. In another implementation, the inventory management system 150 can represent hardware, software instructions, or a combination thereof.

The remote computing resource 203, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction in FIG. 8 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
under control of one or more computing systems configured with executable instructions,
determining, based at least in part on first data collected by a first device, a presence of a user at a first location within a materials handling facility;
receiving a first image of an inventory location that is adjacent the first location;
determining, based at least in part on second data from a second device, at least one of a placement or a removal of an object at the inventory location;
receiving a second image that includes a representation of at least a portion of the first location;
determining, based at least in part on the first image and the second image, an identity of an item associated with the inventory location;
retrieving, from a data store, a user item list associated with the user, the user item list indicating at least items for which control is to be transitioned to the user; and
updating the user item list associated with the user, wherein the updating is based at least in part on the at least one of the placement or the removal of the object and the identity of the item.

2. The computer-implemented method of claim 1, wherein the materials handling facility is at least one of a warehouse, a distribution center, a cross-docking facility, an order fulfillment facility, a packaging facility, a shipping facility, a rental facility, a library, a retail store, a wholesale store, or a museum.

3. The computer-implemented method of claim 1, wherein the first data includes at least one of a third image, an audio data, a triangulation data, a personal identifying data, or a global positioning system data received from a portable device carried by the user.

4. The computer-implemented method of claim 1, wherein the second device is at least one of an image capture device, a pressure sensor, a camera, an infrared sensor, a scale, a volume displacement sensor, a light curtain, a RFID reader, a barcode reader, or a QR code reader.

5. The computer-implemented method of claim 1, wherein determining the identity of the item includes one or more of:
comparing the first image and the second image to determine the identity of the item based at least in part on a pixel comparison or an object difference determination;
determining the identity of the item based at least in part on a change in a weight at the inventory location as determined from data generated by a scale at the inventory location; or
determining the identity of the item based at least in part on a shape or dimension of a bottom of the object as determined from data generated by a pressure sensor at the inventory location.

6. The computer-implemented method of claim 1, wherein determining at least one of the placement or the removal of the object further includes:
determining at least one of a weight of the object or a shape of the object; and
determining, based at least in part on the weight of the object or the shape of the object that the object corresponds with items stored at the inventory location.

7. The computer-implemented method of claim 6, further comprising:
determining items included on the user item list;
wherein determining the identity of the item is further based at least in part on the items included on the user item list;
determining that a confidence score for the identity of the item placed at the inventory location exceeds a threshold; and
wherein updating the user item list includes removing, from the user item list, an item identifier for the identity of the item.

8. The computer-implemented method of claim 1, wherein the first device is at least one of a camera, a personal identifier reader, a microphone, or a GPS receiver.

9. The computer-implemented method of claim 1, further comprising:
determining items associated with the inventory location;
wherein determining the identity of the item is further based at least in part on the items associated with the inventory location;
determining that a confidence score for the identity of the item removed from the inventory location exceeds a threshold; and
wherein updating the user item list includes adding an item identifier for the identity of the item to the user item list.

10. A computing system; comprising:
one or more processors; and
a plurality of memories, each of the plurality of memories coupled with one or more of the one or more processors and storing program instructions that when executed by the one or more processors cause the one or more processors to at least:
determine, based at least in part on first data, a presence of a user at a first location within a materials handling facility;
determine, based at least in part on second data, at least one of a placement or a removal of an object at an inventory location that is adjacent the first location;
determine an identity of an item associated with the inventory location;
retrieve, from a data store, a user item list associated with the user, the user item list indicating at least items for which control is to be transitioned to the user; and
update the user item list associated with the user, wherein the update is based at least in part on the at least one of the placement or the removal of the object and the identity of the item.

11. The computing system of claim 10, wherein the first data includes at least one of a third image, an audio data, a triangulation data, a personal identifying data, or a global positioning system data received from a portable device carried by the user.

12. The computing system of claim 10, wherein the first data is received from a device that is at least one of an image capture device, a pressure sensor, a camera, an infrared sensor, a scale, a volume displacement sensor, a light curtain, a RFID reader, a barcode reader, or a QR code reader.

13. The computing system of claim 10, wherein the program instructions that when executed by the one or more processors to cause the one or more processors to determine at least one of a placement or a removal of an object, further include instructions that when executed by the one or more processors further cause the one or more processors to at least:

determine at least one of a weight of the object or a shape of the object; and determine, based at least in part on the weight of the object or the shape of the object, that the object corresponds with items stored at the inventory location.

14. The computing system of claim 13, wherein the program instructions when executed by the one or more processors further cause the one or more processors to at least:

determine items included on the user item list;

determine that a confidence score of the identity of the item placed at the inventory, location exceeds a threshold; and update the user item list to remove an item identifier for the identified item from the user item list.

15. The computing system of claim 14, wherein the program instructions when executed by the one or more processors further cause the one or more processors to at least:

determine that the identity of the item does not correspond with the inventory location; and send a message to an associate to remove the object from the inventory location.

16. The computing system of claim 10, wherein the program instructions that when executed by the one or more processors to cause the one or more processors to determine at least one of the placement or the removal of the object further include instructions that when executed by the one or more processors further cause the one or more processors to at least:

determine that the object has been removed from the inventory location; and determine that the object corresponds with items stored at the inventory location.

17. A system, comprising:

an inventory location within a materials handling facility that stores a plurality of inventory items;

a camera positioned within the materials handling facility and oriented to include the inventory location in a field of view of the camera;

a first device at the inventory location and operable to detect at least one of a placement or a removal of an object at the inventory location; and one or more computing systems configured with executable instructions that when executed by the one or more computing systems cause the one or more computing systems to at least:

determine a presence of a user within the materials handling facility;

receive a first image of the inventory location from the camera;

determine, based at least in part on first data collected by the first device, at least one of the placement or the removal of the object at the inventory location;

receive a second image of the inventory location from the camera;

determine, based at least in part on the first image and the second image, an identity of an item associated with the inventory location;

retrieve, from a data store, a user item list associated with the user, the user item list indicating at least items for which control is to be transitioned to the user; and update a user item list associated with the user, wherein the update is based at least in part on the at least one of the placement or the removal and the identity of the item.

18. The system of claim 17, wherein the materials handling facility is at least one of a warehouse, a distribution center, a cross-docking facility, an order fulfillment facility, a packaging facility, a shipping facility, a rental facility, a library, a retail store, a wholesale store, or a museum.

19. The system of claim 17, wherein the first data includes at least one of a third image, an audio data, a triangulation data, personal identifying data, or global positioning system data received from a portable device carried by the user.

20. The system of claim 17, wherein the first device is at least one of an image capture device, a pressure sensor, a second camera, an infrared sensor, a scale, a volume displacement sensor, a light curtain, a RFID reader, a barcode reader, or a QR code reader.

21. The system of claim 17, wherein the executable instructions that when executed by the one or more computing systems to determine at least one of the placement or the removal of the object further include instructions that when executed by the one or more computing systems further cause the one or more computing systems to at least:

determine at least one of a weight of the object or a shape of the object; and determine, based at least in part on the weight of the object or the shape of the object that the object corresponds with items stored at the inventory location.

22. The system of claim 21, wherein the executable instructions that when executed by the one or more computing systems further cause the one or more computing systems to at least:

determine items included on the user item list;

wherein determination of the identity of the item is further based at least in part on the items included on the user item list;

determine that a confidence score of the identity of the item placed at the inventory location exceeds a threshold; and wherein the update of the user item list includes removal, from the user item list, of an item identifier for the identity of the item.

23. The system of claim 17, wherein the executable instructions that when executed by the one or more computing systems to determine at least one of the placement or the removal further include instructions that when executed by the one or more computing systems further cause the one or more computing systems to at least:

determine that an object has been removed from the inventory location; and determine that the object corresponds with items stored at the inventory location.

24. The system of claim 23, wherein the executable instructions that when executed by the one or more computing systems further cause the one or more computing systems to at least:

determine items associated with the inventory location;

determine that a confidence score of the identity of the item removed from the inventory location exceeds a threshold; and wherein the update of the user item list includes adding an item identifier for the identified item to the user item list.

* * * * *